(12) United States Patent
Hay et al.

(10) Patent No.: US 11,415,437 B2
(45) Date of Patent: Aug. 16, 2022

(54) SENSOR

(71) Applicant: SKF Magnetic Mechatronics, Saint-Marcel (FR)

(72) Inventors: Stephane Hay, Ailly (FR); Fabien Bercher, Sylvains les Moulins (FR); Alain Boulier, Villegats (FR); Emilien Comoret, Fontaine-sous-Jouy (FR)

(73) Assignee: SKF Magnetic Mechatronics, Saint-Marcel (FR)

( * ) Notice: Subject to any disclaimer, the term of this patent is extended or adjusted under 35 U.S.C. 154(b) by 9 days.

(21) Appl. No.: 15/725,778

(22) Filed: Oct. 5, 2017

(65) Prior Publication Data

US 2018/0128656 A1    May 10, 2018

(30) Foreign Application Priority Data

Oct. 7, 2016 (EP) ..................................... 16306327

(51) Int. Cl.
*G01D 11/24* (2006.01)

(52) U.S. Cl.
CPC .................................. *G01D 11/245* (2013.01)

(58) Field of Classification Search
CPC .................................................. G01D 11/245
See application file for complete search history.

(56) References Cited

U.S. PATENT DOCUMENTS

| | | | |
|---|---|---|---|
| 3,794,204 A * | 2/1974 | Wehmeyer | B65D 39/12 220/235 |
| 5,170,675 A * | 12/1992 | Kawashima | B23Q 1/262 74/89.33 |
| 8,357,862 B2 | 1/2013 | Baudelocque | |
| 2015/0377659 A1 | 12/2015 | Landis | |

FOREIGN PATENT DOCUMENTS

| | | |
|---|---|---|
| CN | 1576835 A | 2/2005 |
| CN | 105229426 A | 1/2016 |
| CN | 107917724 A | 4/2018 |
| DE | 100 21 059 A1 | 11/2001 |
| DE | 10021059 A1 | 11/2001 |
| DE | 10 2014 002991 A1 | 10/2014 |
| DE | 102014002991 A1 | 10/2014 |
| FR | 2 994 021 A1 | 1/2014 |
| FR | 2994021 A1 | 1/2014 |
| JP | 08122165 A | 5/1996 |

* cited by examiner

*Primary Examiner* — Lisa M Caputo
*Assistant Examiner* — Alex T Devito
(74) *Attorney, Agent, or Firm* — Garcia-Zamor Intellectual Property Law; Ruy Garcia-Zamor; Bryan Peckjian

(57) ABSTRACT

A sensor for operating in an environment subjected to corrosive gases or liquids under pressure, including a housing inside which are installed: a sensing portion, at least one wire electrically connected to the sensing portion, and a seal for sealing the connection between the sensing portion and the at least one wire, with at least one through-hole receiving a portion of the at least one wire. The sensor further including a compressor installed inside the housing, movable with respect to the housing and adapted to contact the seal in order to compress. The seal is made from a single material that is softer than the material constituting the housing. Upon displacement of the compressor, the seal is deformed until the creation of a compression force exerted by the seal onto the portion of the at least one wire, prevents any passage of corrosive gases or liquids between the seal therebetween.

20 Claims, 2 Drawing Sheets

SENSOR

CROSS REFERENCE

This application claims priority to European patent application no. 16306327.4 filed on Oct. 7, 2016, the contents of which are fully incorporated herein by reference.

TECHNICAL FIELD OF THE INVENTION

The invention concerns a sensor, in particular a wired sensor.

BACKGROUND OF THE INVENTION

A conventional rotary machine such as a compressor or a turboexpander used in the Oil and Gas industry for the extraction and transportation of the gas or the oil comprises several sensors for controlling or monitoring some parameters such as displacement, speed, temperature, vibration, presence or not of a component. These sensors are often wired, and sometimes in contact with a process gas such as natural gas at pressures up to several hundred bars. Unfortunately this natural gas is corrosive because contains corrosive contaminants or materials such as hydrogen sulfide ($H_2S$), carbon dioxide ($CO_2$) and water.

Efforts have been made recently to improve the resistance to the corrosion of the sensors by using special materials such as stainless steels, PTFE or FEP.

However, the sealing of the sensor remains problematic, and it is still very difficult today to ensure no entrance of any corrosive and/or conductive fluid in the area of the sensor where electrical connections with the wire(s) are made.

Consequently, there is room for improvement.

SUMMARY

The aim of the invention is to provide a sensor for operating in an environment subjected to corrosive gases or liquids under pressure.

To this end, the invention concerns a sensor comprising a housing inside which are installed a sensing portion, at least one wire electrically connected to the sensing portion, and a monobloc seal made from a single material which is softer than the material constituting the housing. The seal is for sealing the connection between the sensing portion and the wire. The seal comprises at least one through-hole receiving a portion of the wire. The sensor comprises also a compressor installed at least partly inside the housing, movable with respect to the housing and adapted to contact the seal in order to compress it. According to the invention, the displacement of the compressor deforms the seal so that a compression force is applied by the seal onto said portion of the wire.

Thanks to the invention, no passage of corrosive gases or liquids between the seal and the wire is possible.

According to further aspects of the invention which are advantageous but not compulsory, such a sensor may incorporate one or several of the following features:

- The deformation of the seal creates another compression force of the seal onto an inner portion of the housing so as to prevent any passage of corrosive gases or liquids between the seal and the housing;
- The compressor comprises a nut and an upper plate which compresses the seal upon tightening of the nut;
- The upper plate comprises anti-rotation means cooperating with the housing so as to prevent any rotation of the upper plate upon rotation of the nut;
- The anti-rotation means consists of at least one flat surface cooperating with a mating flat surface of the housing;
- The seal bears against a lower plate installed inside the housing opposite the compressor with respect to the seal;
- The seal is made of PTFE or FEP and the wire comprises an outer insulator made of FEP or PTFE or a ribbon comprising Kapton and Daglass materials;
- Some potting material is dispensed inside the housing for improving the sealing of the electrical connection between the wire and the sensing portion.

Another object of the invention is the installation or the use of a sensor according to the invention, for measuring a position, a displacement, a speed, a rotational speed, acceleration, a temperature, a pressure, a vibration, or the presence or not of an element or a substance in an electrical motor or a magnetic bearing.

BRIEF DESCRIPTION OF THE DRAWINGS

The invention will now be explained in correspondence with the annexed figures, and as an illustrative example, without restricting the object of the invention. In the annexed figures.

DETAILED DESCRIPTION

Figure 1:
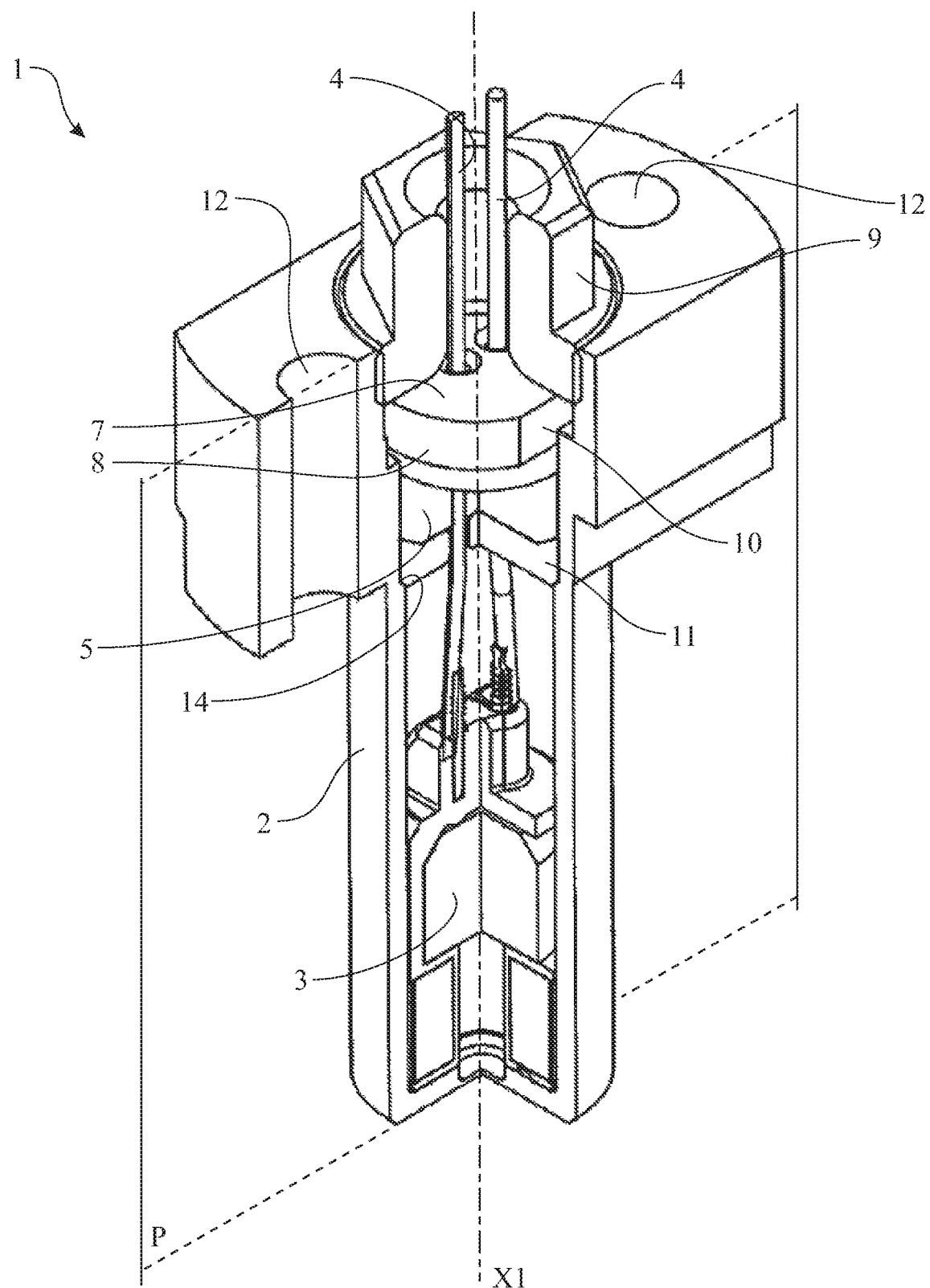
FIG. 1 is a perspective view of a preferred embodiment of sensor according to the invention, where one quarter has been removed in order to better visualize the interior of the sensor.
Figure 2:
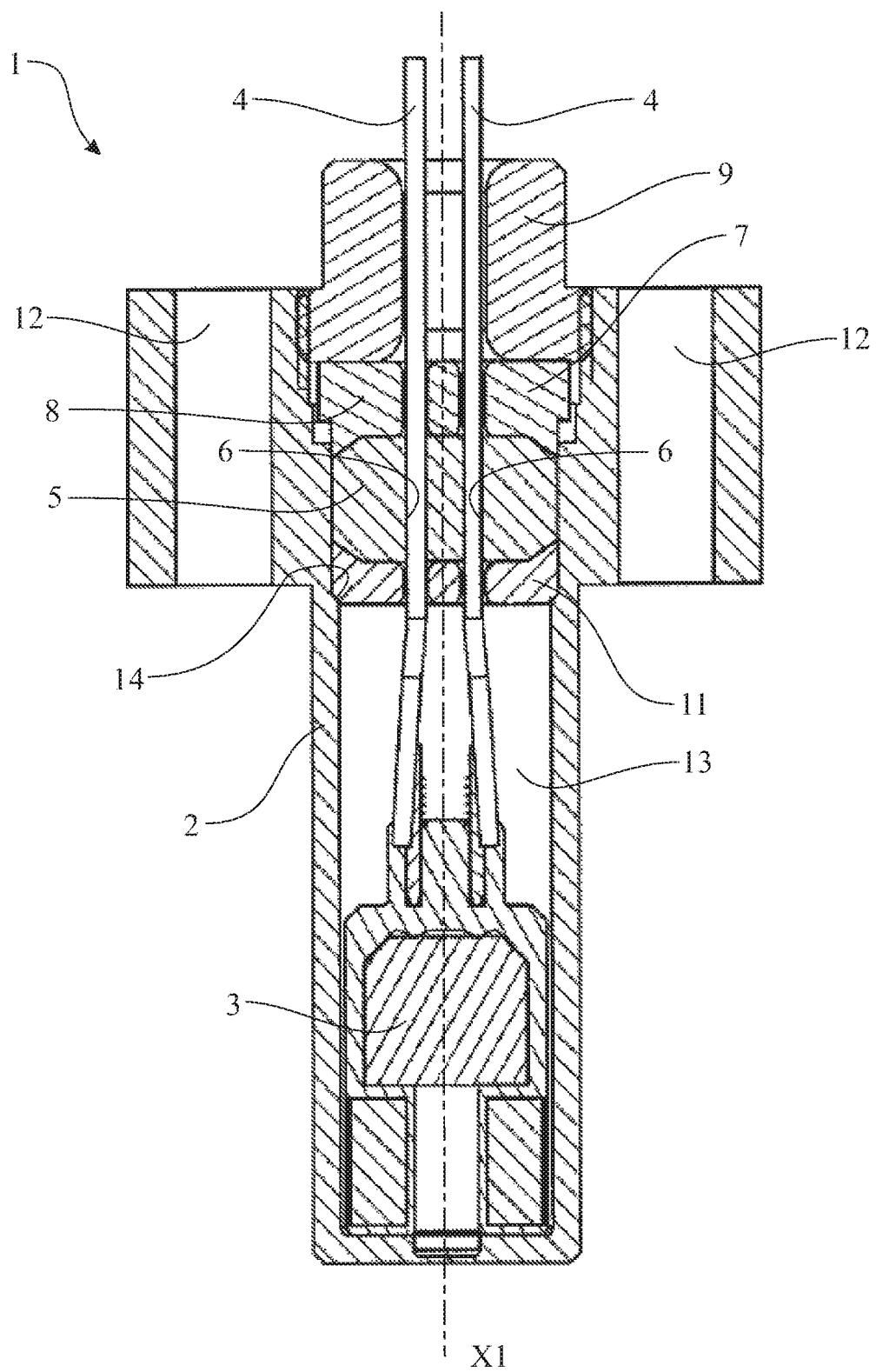
FIG. 2 is a longitudinal sectional view of the sensor of FIG. 1 in the plan P.

FIGS. 1 and 2 show a sensor 1 centered on a central axis X1.

The sensor 1 comprises a housing 2 hosting a sensing portion 3 which is connected at least electrically to at least one wire 4 which extends at least partly inside the housing 2. The sensing portion 3 of the sensor 1 senses one or several parameters among position, displacement, speed, rotational speed, acceleration, vibration, temperature, pressure, presence or not of an element or a substance, in an electrical motor or a magnetic bearing. For example, the sensor 1 measures the rotational speed of a rotor of an active magnetic bearing.

The wire 4 comprises an electrical conductor (not represented) surrounded by an outer insulator (not represented). The insulator isolates the electrical conductor both electrically and chemically from its environment. Advantageously, the insulator is made of FEP or PTFE or a ribbon comprising Kapton and Daglass materials.

The wire 4 is connected to the sensing portion 3 at one of its ends, whereas the other end is coming out of the housing 2.

The wire 4 delivers electrical signals from and/or to the sensing portion 3.

The housing 2 also receives a seal 5 to protect the electrical connection between the sensing portion 3 and the wire 4, and in particular the conductor of the wire 4.

The seal 5 is deformable in all directions.

The seal 5 is monobloc and made of a single material which is softer than the material constituting the housing 2.

The seal 5 is made from a synthetic material such as a thermoplastic material.

The seal 5 is made from a material resistant to high temperatures and to corrosive substances.

Advantageously, the seal 5 is made from PTFE or FEP.

The seal 5 is in the shape of an annular disc. The outer periphery of the disc is facing an inner cylindrical portion of the housing 2. Preferably, the outer diameter of the seal in a non-deformed state is slightly smaller than the diameter of the inner cylindrical portion of the housing 2, so as to easy the installation of the seal inside the housing 2 upon assembly of the sensor 1.

The seal 5 comprises at least one through-hole 6 receiving a portion of the wire 4. When the seal 5 is in a non-deformed state, a small clearance exists between the portion of the wire 4 and the trough-hole, in order to easy the installation of the wire 4 through the seal 5.

The housing 2 further receives a compressor 7 which is at least partly installed inside the housing 2. The compressor is movable with respect to the housing 2.

The compressor 7 is adapted to contact the seal 5 in order to compress it. Upon this compression, the seal 5 deforms in such a way that a compression force exerted by the seal 5 onto said portion of the at least one wire 4 builds up, so as to prevent any passage of corrosive gases or liquids between the seal 5 and the at least one wire 4.

Further, when the seal 5 deforms, another compression force of the seal 5 onto the inner portion of the housing 2 builds up, so as to prevent any passage of corrosive gases or liquids between the seal 5 and the housing 2.

In the illustrated preferred embodiment of the invention, the compressor 7 comprises a nut 9 and an upper plate 8. Upon tightening of the nut 9 along central X1, the upper plate 8 compresses the seal 5. The upper plate 8 is ring-shaped and translates along central axis X1 inside the housing 2. The upper plate 8 is in contact with the housing 2.

Advantageously, the upper plate (8) comprises anti-rotation means (10) cooperating with the housing (2) so as to prevent any rotation of the upper plate (8) around central axis X1 upon rotation of the nut (9). This prevents any twisting of the seal along X1, which would result in a twisting of the wire(s) 4 and/or potential damage to the wire(s) 4 or its electrical connection to the sensing portion 3.

In a preferred embodiment, as visible on FIG. 1, the anti-rotation means 10 consists of at least one flat surface on the outer periphery of the upper plate 8. This flat surface cooperates by contact with a mating flat surface of the housing 2.

The housing 2 also hosts a lower plate 11 against which the seal 5 bears. The housing 2 comprises blocking means 14 against which bears the lower plate 11. The lower plate 11 is opposite the compressor 7 with respect to the seal 5. Upon tightening of the nut 9, the seal is compressed between the upper plate 8, the lower plate 11 and the housing 2.

The blocking means 14 prevent any axial movement of the lower plate 11, that is to say in a direction parallel to the central axis X1, and in particular in the direction opposite to the sensing portion 3 of the sensor 1.

In the illustrated embodiment of the invention, the blocking means 14 consists of a annular chamfer. Preferably, the angle of the chamfer with respect to central axis X1 is 45°.

Still in the illustrated embodiment, the sensor 1 comprises two wires 4 and the seal 5 comprises two through-holes 6, each through-hole 6 receiving one wire 4.

The lower plate 11, the upper plate 8 and the nut 9 each comprises at least one through-hole for the passage of the at least one wire 4.

Central axis X1 is a common symmetry axis for the housing 2, the seal 5, the compressor 7, the lower plate 11, the upper plate 8 and the nut 9.

The sensor further comprises installation means 12 for installing or attaching the sensor to an element. On the illustrated preferred embodiment of the invention, the installation means 12 consists of 2 through-holes through which screws or bolts (not represented) can be inserted. Any other suitable known attachment means can be used, based on the requirements of the application and the environment where the sensor 1 is used. For example, the sensor 1 is installed onto the stator of a rotary electrical machine and measures a parameter of the rotor of the rotary electrical machine.

In order to further enhance the sealing of the electrical connection between the sensing portion 3 and the wire 4, the housing is filled with potting material 13.

The potting material 13 occupies at least partly the free space inside the housing.

In particular, some potting material is dispensed in the area where the electrical connection between the wire 4 and the sensing portion 3 is made.

Alternatively or in addition, some potting material is dispensed in other areas such as the ones comprising the seal 5 and/or the compressor 7.

The sensor 1 is assembled in the following way. In a first step, one end of the wire(s) 4 is electrically connected to the sensing portion 3, the other end of the wire(s) 4 remaining in a free state. This free end of the wire(s) 4 is then inserted by order through the lower plate 11, the seal 5, the upper plate 8 and the nut 9. The obtained arrangement is then installed inside the housing 2 of the sensor 1. Some potting material 13 is dispensed inside the housing 2 in the area where the electrical connection between the wire 4 and the sensing portion 3 is made. The nut 9 is then tightened by applying a predetermined displacement or torque value until the seal 5 hermetically seals that area of electrical connection. Finally, some potting material 13 is dispensed in the compressor 7, in particular in the through-holes of the upper plate 8 and the nut 9.

Thanks to the invention, the electrical connection between the wire(s) 4 and the sensing portion 3 is hermetically sealed from the outside of the sensor 1, permanently but reversibly.

In addition, technical features of the different embodiments can be, in whole or part, combined with each other.

NOMENCLATURE

X1 central axis
1 sensor
2 housing
3 sensing portion
4 wire
5 seal
6 through-hole
7 compressor
8 upper plate
9 nut
10 anti-rotation means
11 lower plate
12 installation means
13 potting material
14 blocking means

The invention claimed is:

1. A sensor for operating in an environment subjected to corrosive gases or liquids under pressure, the sensor comprising:
a housing comprising a mating flat surface, the housing having installed:
a sensing portion,
at least one wire electrically connected to the sensing portion, and
a compressible seal for sealing the connection between the sensing portion and the at least one wire, with at least one through-hole receiving a portion of the least one wire, the compressible seal being located in a portion of the housing defined by an inner housing surface, the portion of the housing being configured to hold the compressible seal such that the seal has a maximum outer diameter, wherein the compressible seal is monobloc and made from a single material which is softer than the material constituting the housing,
the sensor further providing a compressor installed at least partly inside the housing, movable with respect to the housing and adapted to contact the compressible seal in order to compress it, the compressor comprising an anti-rotation means that includes at least one flat surface cooperating with the mating flat surface,
an upper plate positioned in the housing and adjacently abutting a side of the compressible seal opposite from the sensing portion, the upper plate being formed of rigid material and defining at least one plate through-hole adapted to allow the at least one wire therethrough, the upper plate configured to move within the housing along the central axis during compression of the compressible seal, when viewed in cross-section, an upper plate surface which faces toward the sensing portion and contacts the compressible seal has a concave configuration which is symmetrically located about the central axis,
wherein a portion of the upper plate defines an upper plate diameter that is greater than the maximum outer diameter of the compressible seal, and
wherein upon displacement of the compressor, the compressible seal is deformed until the creation of compression forces exerted by the compressible seal onto: (1) the portion of the at least one wire, (2) the inner housing surface, and (3) the at least one plate through-hole prevents any passage of corrosive gases or liquids between the compressible seal and the at least one wire.

2. The sensor according to claim 1, wherein the upper plate is configured to prevent twisting of the compressible seal along a longitudinal axis of the housing, the compressible seal prevents any passage of corrosive gases or liquids between the compressible seal and the housing.

3. The sensor according to claim 1, wherein the compressor further provides a nut, the upper plate compressing the compressible seal upon tightening of the nut, except for threads of the nut a lower end of the nut entirely contacts an upper surface of the upper plate.

4. The sensor according to claim 3, wherein the upper plate includes the anti-rotation means preventing any rotation of the upper plate upon rotation of the nut.

5. The sensor according to claim 1, wherein the compressible seal bears against a lower plate installed inside the housing and opposite the compressor with respect to the compressible seal, the lower plate diameter which is less than the upper plate diameter.

6. The sensor according to claim 1, wherein the compressible seal is made of PTFE or FEP and the at least one wire comprises an outer insulator made of FEP or PTFE.

7. The sensor according to claim 1, wherein the sensor comprises two wires and the compressible seal comprises two through-holes, each through-hole receiving one wire, the upper plate having a concave surface which abuts the side of the compressible seal opposite from the sensing portion, the sensor further comprising a lower plate having a concave shape which contacts a second side of the compressible seal opposite from the upper plate to such that the upper and lower plates sandwich the compressible seal therebetween.

8. The sensor according to claim 1, wherein potting material is dispensed inside the housing to further improve the sealing of the electrical connection between the wire and the sensing portion of the sensor.

9. The sensor according to claim 1, wherein anti-rotation means prevents twisting of the compressible seal along a central axis of the sensor to avoid twisting of and damage to the at least one wire or the sensing portion.

10. The sensor according to claim 1, wherein the housing comprises a blocking means against which bears a lower plate installed inside the housing.

11. The sensor according to claim 10, wherein the lower plate is opposite the compressor with respect to the compressible seal.

12. The sensor according to claim 10, wherein the blocking means prevents axial movement of the lower plate a direction parallel to a central axis of the sensor.

13. A sensor for measuring a position, a displacement, a speed, a rotational speed, an acceleration, a temperature, a pressure, a vibration, the presence or not of an element or a substance in an electrical motor or a magnetic bearing, the sensor comprising:
a housing comprising a mating flat surface, the housing having installed:
a sensing portion,
at least one wire electrically connected to the sensing portion, and
a compressible seal for sealing the connection between the sensing portion and the at last one wire, with at least one through-hole receiving a portion of the at least one wire, the compressible seal being located in a portion of the housing defined by an inner housing surface, the portion of the housing being configured to hold the compressible seal such that the seal has a maximum outer diameter, wherein the compressible seal is monobloc and made from a single material which is softer than the material constituting the housing,
the sensor further providing a compressor installed at least partly inside the housing, movable with respect to the housing and adapted to contact the compressible seal in order to compress it, the compressor comprising an upper plate positioned in the housing and adjacently abutting a side of the compressible seal opposite from the sensing portion, the upper plate being formed of rigid material and defining at least one plate through-hole adapted to allow the at least one wire therethrough, the upper plate configured to move within the housing along the central axis during compression of the compressible seal, when viewed in cross-section, an upper plate surface which faces toward the sensing portion and contacts the compressible seal has a concave configuration which is symmetrically located about the central axis, wherein a portion of the upper plate defines an upper plate diameter that is greater than the maximum outer diameter of the compressible seal, the compressor comprising an anti-rotation means that includes at least one flat surface cooperating with the mating flat surface, wherein the compressible seal is monobloc and made from a single material which is softer than the material constituting the housing, wherein a surface of the compressible seal facing away from the sensing portion is in contact with at least one of the portion of the housing, the upper plate, and the at least one wire and is not in contact with the rest of the sensor, and wherein upon displacement of the compressor, the compressible seal is deformed until the creation of compression forces exerted by the compressible seal onto: (1) the portion of the at least one wire, (2) the inner housing surface, and (3) the at least one plate through hole prevents any passage of corrosive gases or liquids between the compressible seal and the at least one wire.

14. The sensor according to claim 13, wherein the upper plate is configured to prevent twisting of the compressible seal along a longitudinal axis of the housing, the compressible seal prevents any passage of corrosive gases or liquids between the compressible seal and the housing.

15. The sensor according to claim 13, wherein the compressor further a nut, the upper plate compressing the compressible seal upon tightening of the nut, except for threads of the nut a lower end of the nut entirely contacts an upper surface of the upper plate.

16. The sensor according to claim 15, wherein the upper plate includes the anti-rotation means preventing any rotation of the upper plate upon rotation of the nut.

17. The sensor according to claim 13, wherein the compressible seal bears against a lower plate installed inside the housing and opposite the compressor with respect to the compressible seal, the lower plate having a lower plate diameter which is smaller than the upper plate diameter.

18. The sensor according to claim 13, wherein the compressible seal is made of PTFE or FEP and the at least one wire comprises an outer insulator made of FEP or PTFE.

19. The sensor according to claim 13, wherein the sensor comprises two wires and the compressible seal comprises two through-holes, each through-hole receiving one wire, the upper plate having a concave surface which abuts the side of the compressible seal opposite from the sensing portion, the sensor further comprising a lower plate having a concave shape which contacts a second side of the compressible seal opposite from the upper plate to such that the upper and lower plates sandwich the compressible seal therebetween.

20. The sensor according to claim 13, wherein potting material is dispensed inside the housing to further improve the sealing of the electrical connection between the wire and the sensing portion of the sensor.

* * * * *